United States Patent [19]

Michon

[11] Patent Number: 4,662,196
[45] Date of Patent: May 5, 1987

[54] LOCK FOR AN OIL FIELD VALVE

[76] Inventor: John M. Michon, 1237A Post Oak Park, Houston, Tex. 77027

[21] Appl. No.: 895,121

[22] Filed: Aug. 11, 1986

[51] Int. Cl.[4] .............................................. B60R 25/02
[52] U.S. Cl. ....................................... 70/177; 70/184; 70/232
[58] Field of Search ........................... 70/158, 163–164, 70/166–173, 175–179, 182–185, 201–202, 229–230, 232; 137/382, 383, 385

[56] References Cited

U.S. PATENT DOCUMENTS

| | | | |
|---|---|---|---|
| 2,377,036 | 5/1945 | Quarfoot | 70/178 |
| 3,172,282 | 3/1965 | Heckrotte | 70/178 |
| 3,500,130 | 2/1971 | Horhota | 137/385 |
| 3,540,468 | 11/1970 | Finck | 70/178 |
| 4,208,893 | 6/1980 | Avrich | 70/178 |
| 4,377,178 | 3/1983 | Thompson | 70/177 |

Primary Examiner—Robert L. Wolfe

[57] ABSTRACT

An anti-theft lock for oilfield valves where a base member fits over and attaches to a valve so that the valve stem projects outwardly of the base member. A cover member has pins received in locking bores in the base member where independent keys operate independent locks to lock the cover member to the base member.

4 Claims, 4 Drawing Figures

LOCK FOR AN OIL FIELD VALVE

FIELD OF THE INVENTION

This invention relates to locks for protecting valves and the like and more particularly for providing a reliable transportable lock for an oil field valve to prevent unauthorized operation of the valve.

BACKGROUND OF THE INVENTION

In oil field operations, there are many oil fields at remote locations where the accumulated oil production can be stolen by the operation of a control valve on the oil storage tank. Such theft of oil is a well known and common problem and heretofore there has been no effective simple way of preventing unauthorized operation of flow control valves in an oil field operation.

A lock for a fuel line valve is shown in U.S. Pat. No. 4,420,314.

In the present invention, lock means are provided which are attachable to an oil field valve and have dual keyed control means for access control thus preventing unauthorized operation of an oil field valve.

THE PRESENT INVENTION

The present invention involves a lock means comprised of a lock base member constructed of aluminum or other material which resists cutting with a cutting torch. The lock base member is arranged so as to be securely attached to a valve body as an integral part thereof and provide a base member for a matching lock cover member. The lock cover member has hardened tool steel dowels or pins which interfit into openings in the lock base member. The lock cover member is provided with a uniform side configuration to compliment the side configuration of the lock base member and has an internal recess to enclose the valve stem of the control valve in the valve body. The lock base member is provided with two independent keying means which operate an interlocking mechanism which is adapted to cooperate with either one of the hardened steel dowels in the lock cover member to interlock the lock base member and the lock cover member. A pin member on the lock base member extends through an opening in the lock cover member and permits the lock cover member to be disengaged from the lock base member to permit access to the valve stem and yet be retained as a part of the locking device. The locking device is attachable to the valve without valve modification and can be removed and transported to other valves as desired.

DESCRIPTION OF THE INVENTION

Figure 1:
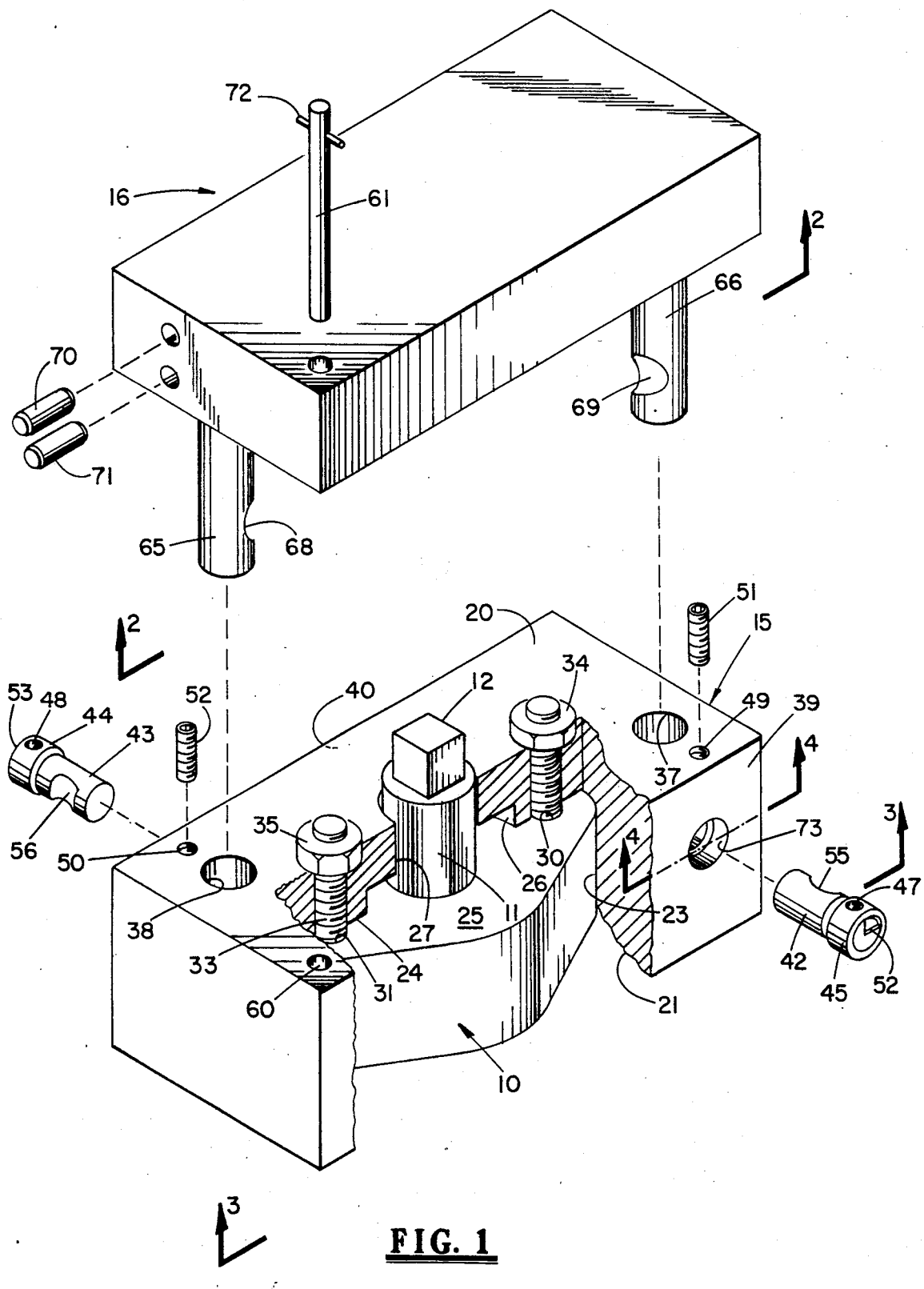
FIG. 1 is an exploded perspective view of the lock member installed on a typical valve.

Referring now to the exploded perspective view of FIG. 1, a valve flange is indicated by the numeral 10. The valve flange 10 is somewhat ovular in shape and is the top member or cover for a valve body (not shown) which connects to a flow line (not shown). In the valve body is a valve element (not shown) which controls flow (on or off) where the valve element is positioned in an "on" or "off" condition by a valve stem 11 which projects upwardly from a flange 10. At the top of the valve stem 11 is a wrench surface 12 which can be gripped by a hand wrench to rotatively operate the valve element. The valve may be of any type for use of the present invention so long as it has a top cover and projecting valve control element.

The purpose of the present invention is to provide a simple lock attachment unit which can be affixed to a valve body to enclose the valve stem 11 and be releasably locked in position. Upon unlocking the attachment unit, the valve stem 11 can be uncovered for operation of the valve.

The lock attachment unit as shown in FIG. 1 includes a lower base member 15 which is attachable to the valve body and an upper cover plate 16 which is removable from base member 15 to permit access to the valve stem 11.

The base member 15 is rectangularly shaped and constructed of aluminum. The top and bottom surfaces 20 and 21 of the base member 15 are flat and parallel to one another.

Extending inwardly and upwardly from the bottom surface 21 is a flange recess 23 which is configured and sized to form a receptacle for a valve flange 10 with the bottom surface 24 adapted to seat upon the upper surface 25 of the valve flange 10. A circular recess 26 may be provided if the flange 25 has a circularly shaped protrusion. In any event, the recess 23 in the base member 15 conforms substantially to the outer and upper configuration of the flange 10 on the valve and is seated on the upper surface of a valve. An opening 27 in the base member 15 permits the valve stem to project through the base member so that the wrench surface 12 is located above the top surface 20. The flange 10 has bolt holes 30, 31 which extend through the flange and align with threaded openings (not shown) in a valve body. Bolts 32, 33 extend through the bolt holes 30, 31 and threadedly attach to a valve body. Nuts 34, 35 attach to the bolts 32, 33 and affix the base member 15 and flange to a valve body. The base member 15, as described is attachable to a valve body while permitting access to the valve control member or valve stem 11.

Figure 3:
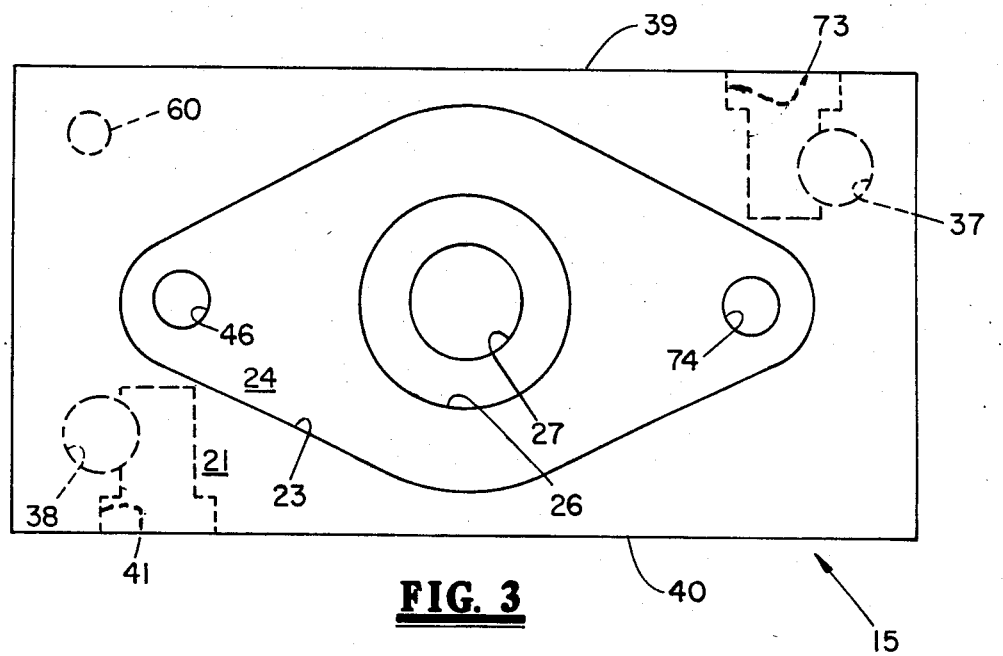
FIG. 3 is a view taken along line 3—3 of FIG. 1.
Figure 4:
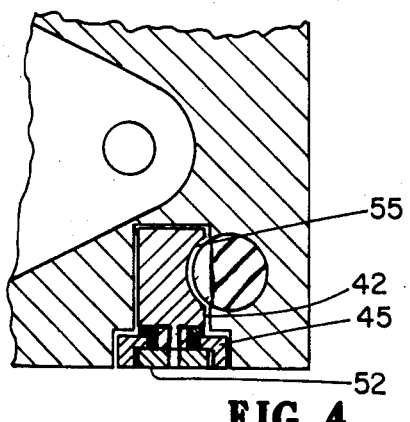
FIG. 4 is a partial view in cross section through a lock taken along line 4—4 of FIG. 1.

The base member 15 has blind bores 37 and 38 extending downwardly from the top surface 20, the bores 37 and 38 being located at opposite corner locations on the base member 15. On the side surfaces 39, 40 are transverse blind bores 73, 41 which are offset from the vertical bores 37, 38 but partially intersect the respective vertical bores 37, 38 (FIG. 3). Each transverse blind bore 73, 41 receives a cylindrically shaped locking member 42, 43, each locking member having a locking ring 44, 45 which rotatably receives a locking member 42, 43. The locking rings 44, 45 respectively have a locking recess 47, 48 which respectively align with a vertical threaded locking bore 49, 50. A locking screw 51, 52 is respectively insertable into a bore 49, 50 to engage a locking recess 47, 48 and fix the locking ring 45, 44 relative to the base member 15. A key mechanism 52, 53 is provided for each locking member 42, 43 so that insertion of a key member (not shown) and rotation will rotate a member 42, 43 through 90° of rotation. Each key mechanism 52, 53 requires a different key member so that operation of the key mechanisms requires the possession of two different key members by one person or two persons each having possession of one key member. Each locking member 42, 43 have a semi-cylindrical recess 55, 56 where the recess provides a continuation of the vertical bores 37, 38 in the position shown.

At one of the other corner locations, is a vertical blind bore 60 which receives a locking pin 61 which is force fit into the bore for retention of the pin 61 relative to the base member 15.

The bolts 32 and 33 are arranged so that the bolts pass through openings 46, 74 in the base member 20 and the nuts 34, 35 attach the base member 15 to the flange 10 by contact with the upper surface 25.

Figure 2:
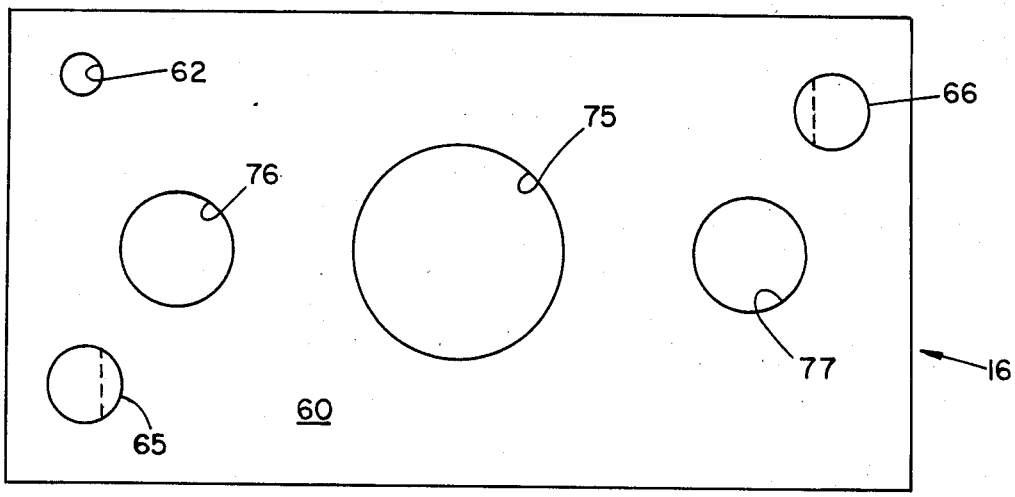
FIG. 2 is a view taken along line 2—2 of FIG. 1.

As shown in FIGS. 1 and 2, the upper lock cover member 16 is rectangular in shape and is constructed of aluminum and has a central blind bore recess 75 (See FIG. 2) which is adapted to receive the upper end of the valve stem 14 so that when the lower face 60 of the upper lock cover member 16 is in contact with the upper face 20 of the lower base lock member 15, the valve stem 11 is completely enclosed. Blind bore recesses 77 and 76 are provided in the cover member 16 to accomodate and enclose the nuts 34 and 35. In another corner location is an opening 62 through the cover member 16 which slidably receives the pin 61 and permits the pin 61 to project upwardly above the upper lock cover member 16. The lock cover member 16 has downwardly extending, cylindrically shaped locking pin members 65 and 66 which are slidably received in the bores 37, 38. The locking pin members 65, 66 have semi-cylindrical recesses 68, 69 which align with the bores 73, 41. The locking pin members 65, 66 are received in blind bores 76, 77 in the cover member 16 and held fixed in position by hardened steel dowel pins 70, 71. When assembled, the locking members 42, 43 are rotated from the position shown through a 90° angle so that the cylindrical surfaces of a locking member are brought into engagement with the locking recesses 68, 69 in the locking pin members 65, 66 and provide a locking action. The locking members 42, 43 are operated by keying members.

The locking members 42, 43 are attached to keying mechanisms 52, 53 and hardened steel cylindrically shaped locking rings 44, 45 which are press fitted into recessed openings 41, 73 respectively in the sides of the lock base member. The lock rings 45, 48 are secured by bolt means 51, 52 which extend through threaded openings 49, 50 to prevent removal of the keying mechanism 52, 53. The hardened disks 45, 44 have openings therein for reception of keying members. The keying mechanisms 52, 53 are schematically illustrated and are comprised of convention commercially available key operated lock cylinders.

The pin member 61 which projects through the opening 62 in the upper lock cover member 16 extends a sufficient distance above the upper lock cover member 16 so that a stop member 72 on the pin permits the upper lock cover to be raised a sufficient distance for the locking pins 65, 66 in the upper lock cover member 16 to clear the lock base member 15 and permit rotation of the cover member 16 a sufficient distance out of the way so that the valve member 11 can be operated and also maintains the upper base cover 16 and lower member 15 as an integral unit.

The construction of the assembly as illustrated and explained, prevents unauthorized operation of the valve. Safety control is provided by the requirement of independent keys. The valve stem cannot be moved without removing the lock. However the lock can easily be removed by authorized personnel with the appropriate keys. By locating the keying mechanisms on the side, the weather elements do not adversely affect the key mechanisms.

It will be apparent to those skilled in the art that various changes may be made in the invention without departing from the spirit and scope thereof and therefore the invention is not limited by that which is enclosed in the drawings and specifications but only as indicated in the appended claims.

What is claimed is:

1. A locking device for oil field valves or the like including:

a lock base member having a recessed portion extending from a bottom surface of the base member, said recessed portion being configured to fit over a valve flange and to a body of a valve, an opening in said base member extending through said base member so that when the base member is located on a valve body, a valve stem of a valve can project through the base member and be manipulated with the base member in position on a valve body, at least two first locking bores extending downwardly from an upper surface of said base member, at least two second locking bores extending inwardly from the respective sides of said base member and partially intersecting said locking bores;

means for affixing a base member onto a valve body;

a lock cover member having a lower surface adapted for complimentary engagement with the upper surface of the base member;

at least two locking pin members attached to said lock cover member and extending downwardly from the lower surface of said cover member, each of said pin members having semi-cylindrical recesses to align with said second bores;

said lock cover member having recessed portions extending upwardly from said lower surface to internally receive said locking pin members, the valve stem of a valve, and the means which interconnect the cover member, base member and valve body; and keying and locking means in each of said second locking bores including cylindrical locking members with semi-cylindrical recesses to align with said first bore and rotatively movable into and out of engagement with said locking pin members for releasably interconnecting said cover member to said base member so that said cover member can be removed relative to said base member to permit access to the valve stem of a valve and can be interconnected to said base member and enclose said locking pin members, the valve stem and the bolt heads on the bolt means.

2. The apparatus as set forth in claim 1 wherein said lock base member has an attached, upwardly extending connection pin member extending upwardly from the upper surface of said base member through an aligned opening in said lock cover member, said connection pin member extending above the upper surface a distance sufficient for permitting said lock cover member to be displaced upwardly and away from a valve stem thereby permitting access to a valve stem without disconnection of the lock base member and lock cover member.

3. The apparatus as set forth in claim 2 including a stop means on said connection pin member for limiting upward travel of the lock cover member.

4. The apparatus as set forth in claim 1 wherein said keying and locking means are respectively keyed to utilize different key members.

* * * * *